Patented June 16, 1925.

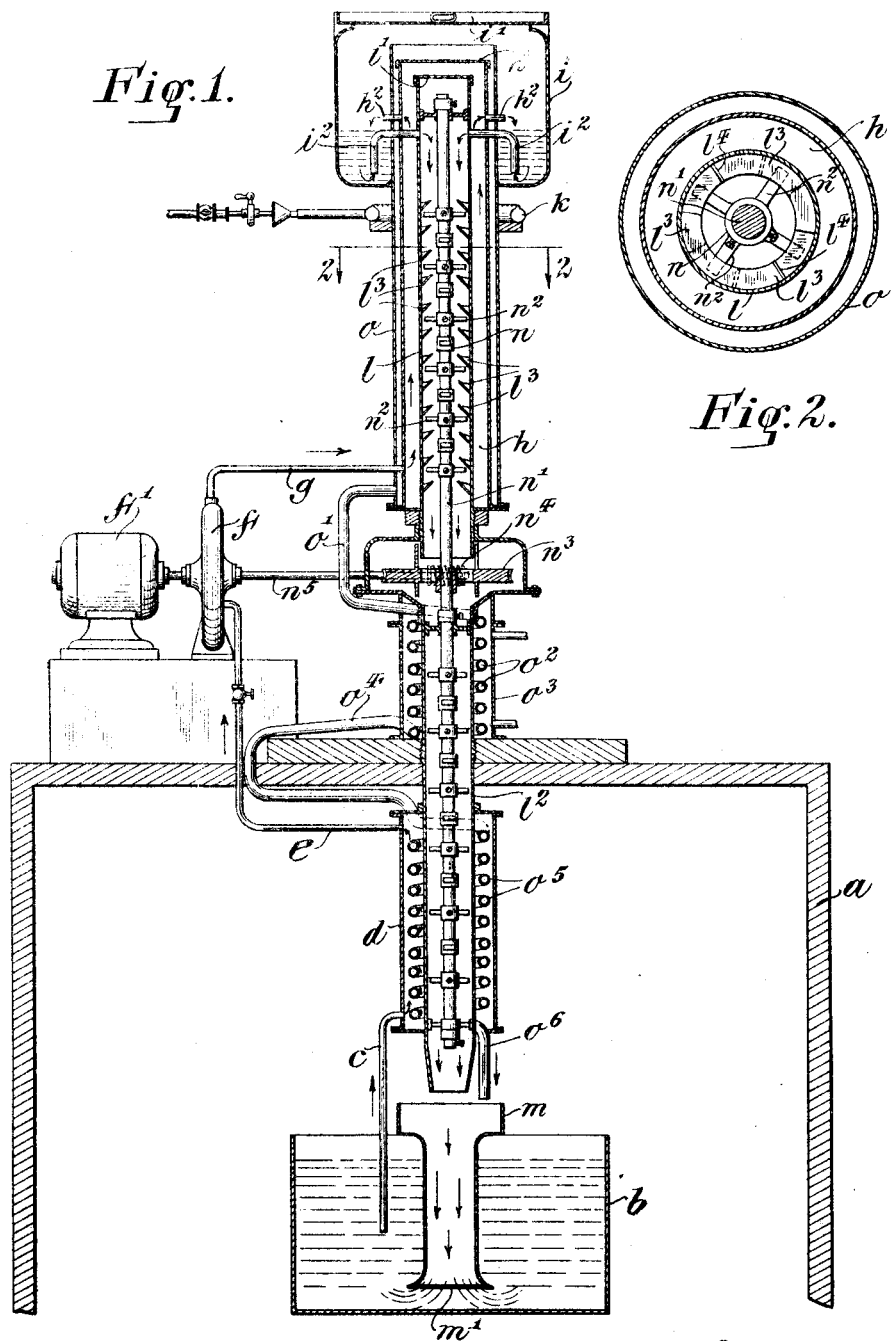

1,541,968

UNITED STATES PATENT OFFICE.

DONALD B. KNIGHT, OF BROOKLYN, NEW YORK.

REFRIGERATION.

Application filed January 9, 1925. Serial No. 1,343.

*To all whom it may concern:*

Be it known that I, DONALD B. KNIGHT, a citizen of the United States, residing in the borough of Brooklyn of the city of New York, in the State of New York, have invented certain new and useful Improvements in Refrigeration, of which the following is a specification, reference being had to the accompanying drawings, forming a part hereof.

This invention relates generally to the practice of refrigeration through the absorption of heat in the process of solution of a relatively dry, granular or crystalline substance, such as a salt, in a solvent. This mode of refrigeration, although well understood, has not been deemed to be practically applicable to refrigerators of relatively small capacity, such as domestic refrigerators, in part because of its lack of efficiency and loss of materials as commonly carried on and in part because no satisfactory apparatus has been provided by means of which refrigeration can be carried on continuously and automatically, that is, without the frequent or occasional performance of manual operations, particularly in handling the substance to be dissolved and the solvent. It is the object of this invention to provide an apparatus by means of which refrigeration by the method referred to can be carried on continuously and automatically and in which there shall be practically no loss either of the substance to be dissolved or of the solvent. In accordance with the invention, provision is made whereby the solution or brine which has performed its function in the absorption of heat is concentrated and the practically dry salt or other substance, and the solvent, are separated and returned separately to the brine tank where the process of solution goes on continuously. The invention will be described more fully hereinafter with reference to the accompanying drawing in which it is illustrated as embodied in a suitable form of apparatus and in which—

Figure 1 is a view of such apparatus in vertical sectional elevation and

Figure 2 is a view in horizontal section on the plane indicated by the broken line 2—2 of Figure 1, but on a larger scale.

In the chamber to be refrigerated, indicated at $a$, is placed a vessel $b$ in which the process of solution of the substance to be dissolved, such as ammonium nitrate, in the solvent employed, such as water, takes place. For convenience and brevity in this description the substance to be dissolved will be referred to as a salt, the solvent as water, and the solution of the salt in water as brine. In the brine tank $b$ the brine reaches its lowest temperature and is drawn thence through a pipe $c$, a jacket $d$ also within the refrigerating chamber, and a pipe $e$, by a motor driven pump $f$, placed outside of the refrigerating chamber $a$. From the pump the brine is delivered through a pipe $g$ into a preferably cylindrical vessel or jacket $h$ which may be capped at its upper end, as at $h'$ and is provided near its upper end with outlet pipes $h^2$ which deliver the brine into a vessel $i$, which may be called a kettle. A source of heat, indicated at $k$, is associated with the kettle $i$ for the purpose of concentrating the brine therein to a degree which will bring it nearly to the point of crystallization but leaving it still liquid. The kettle is provided with a cover $i'$ for the purpose of preventing the escape of the steam developed in the process of concentration. Through outlets $i^2$, which have their intake ends submerged below the surface of the concentrated brine in the kettle, the concentrated brine passes into a central vessel or tube $l$, which is capped as at $l'$. Through the tube $l$ and an extension $l^2$ thereof, the salt, losing the remaining water, passes back to the brine tank $b$, preferably entering the same through a mixer $m$ to which the solvent water is also supplied as hereinafter described. The salt or substance to be dissolved is selected with reference to its ability to remain in solution with a small quantity of solvent and to give up readily the small remaining amount of solvent. Ammonium nitrate, for example, is found to be well suited for the purpose as it will remain in hot solution up to a strength of perhaps 98% and will give up readily the remaining moisture when the solution is cooled. To promote the cooling of the hot solution and the crystallization of the salt the tube $l$ is preferably jacketed by the vessel $h$ through which the cold brine is delivered to the kettle. For the further purpose of retarding the movement of the crystallizing salt, and therefore of subjecting it longer to the cooling action, the interior of the tube $l$ is provided with short inclined shelves $l^3$, which are disposed in vertically staggered relation as shown in Figure 2 and are walled at one end, as at $l^4$, so that the saturated liquid, as it descends from the outlets $i^2$, will trickle from one shelf or baffle plate to another below it. For the purpose of further promoting the cooling of the saturated solution and therefore the crystallization of the salt, there is provided in the tube $l$ an agitator $n$, the function of which is to throw the saturated solution and the salt as it loses its water against the cold wall of the tube. The agitator shown comprises a vertical shaft $n'$ mounted in suitable bearings and armed with paddles $n^2$; the shaft has secured thereto at a suitable point a skeleton worm gear $n^3$ which is engaged by a worm $n^4$ on the shaft $n^5$ of the motor $f'$ which drives the centrifugal pump $f$.

Around the jacket $h$ is an outer jacket $o$ which is open at its upper end within the kettle $i$ for the purpose of receiving the steam generated in the process of concentration of the solution in the kettle. The jacket $o$ forms a condensing conductor which is cooled internally by the relatively cold brine in the jacket $h$ and externally by contact with the atmosphere. In this condensing conductor the steam generated in the process of condensation is condensed and the water of condensation and steam pass thence through a pipe $o'$ into a coil $o^2$ which may be jacketed for the further carrying on of the process of condensation in a water cooled jacket $o^3$. From the coil $o^2$ the water of condensation is carried through a pipe $o^4$ into a coil $o^5$ within the jacket $d$, the water of condensation being cooled therein nearly to the temperature of the brine by the cold brine which is pumped up from the brine tank $b$ through the jacket $d$. Finally, the cooled water of condensation is delivered through a pipe $o^6$ into the mixer $m$ where it is mixed with the salt crystals delivered from the pipe $l^2$. The mixer $m$ may consist of a suitably shaped tube in which the mixing of the salt and the solvent takes place, the open lower end of the tube preferably having a screen $m'$ to retain undissolved crystals in order that they may be completely dissolved before the brine passes from the mixer into the main body of the brine tank.

It will be understood, of course, that the salt crystals may gather to some extent upon some of the lower shelves $l^3$, but if so they will fall off as they accumulate or will be brushed off by the paddles $n^2$ of the agitator.

It will be understood that various changes in details of construction and arrangement can be made to suit different conditions of use and that, except as pointed out in the accompanying claims, the invention is not restricted to the particular construction shown and described herein.

I claim as my invention:

1. Refrigerating apparatus comprising a brine tank, a concentrator, means to deliver brine from the tank to the concentrator, means to return the soluble substance from the concentrator to the tank, and means to supply solvent continuously to the tank.

2. Refrigerating apparatus comprising a brine tank, a concentrator, means to deliver brine from the tank to the concentrator, means to return the soluble substance from the concentrator to the tank, and means to condense the vapor of the solvent and to return the water of condensation to the tank.

3. Refrigerating apparatus comprising a brine tank, a concentrator, a tube communicating at its upper end with the concentrator and arranged to discharge the soluble substance into the tank, and means to supply solvent to the tank.

4. Refrigerating apparatus comprising a brine tank, a concentrator, a tube communicating at its upper end with the concentrator and arranged to discharge the soluble substance into the tank, means to condense the vapor of the solvent and return the water of condensation to the tank.

5. Refrigerating apparatus comprising a brine tank, a concentrator, a tube communicating at its upper end with the concentrator and arranged to discharge the soluble substance into the brine tank, an agitator within the tube, and means to supply solvent to the brine tank.

6. Refrigerating apparatus comprising a brine tank, a concentrator, a tube communicating at its upper end with the concentrator and arranged to discharge the soluble substance into the tank and provided interiorly with a succession of shelves, an agitator within the tube comprising a shaft and paddles, and means to supply solvent to the tank.

7. Refrigerating apparatus comprising a brine tank, a concentrator, a pump and tubes to deliver the brine from the tank to the concentrator, means to return the soluble substance from the concentrator to the tank, and means to supply solvent to the tank.

8. Refrigerating apparatus comprising a brine tank, a concentrator, a pump and tubes to deliver the brine from the tank to the concentrator, means to return the soluble substance from the concentrator to the tank, and tubes to condense the vapor of the solvent and return the water of condensation to the tank.

9. Refrigerating apparatus comprising a brine tank, a concentrator, a pump and tubes to deliver the brine from the tank to the concentrator, means to return the soluble substance from the concentrator to the tank, tubes to condense the vapor of the solvent and return the water of condensation to the tank, and means to apply the cooling effect of the brine to cool the soluble substance on its way from the concentrator to the tank.

10. Refrigerating apparatus comprising a brine tank, a concentrator, a pump and tubes to deliver the brine from the tank to the concentrator, means to return the soluble substance from the concentrator to the tank, tubes to condense the vapor of the solvent and return the water of condensation to the tank, and means to apply the cooling effect of the brine in its passage to the concentrator to cool and condense the vapor from the solvent in its passage from the concentrator to the tank.

This specification signed this 2d day of January A. D. 1925.

DONALD B. KNIGHT.